US 8,527,669 B2

(12) United States Patent
Okada

(10) Patent No.: US 8,527,669 B2
(45) Date of Patent: Sep. 3, 2013

(54) COMMUNICATION APPARATUS AND METHOD FOR COMMUNICATING WITH AN EXTERNAL DEVICE THROUGH USB INTERFACE USING A HIGH-SPEED OR LOW-SPEED COMMUNICATION MODE

(75) Inventor: Hiroki Okada, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 155 days.

(21) Appl. No.: 13/159,937

(22) Filed: Jun. 14, 2011

(65) Prior Publication Data
US 2012/0047294 A1 Feb. 23, 2012

(30) Foreign Application Priority Data

Aug. 20, 2010 (JP) .................. 2010-184819

(51) Int. Cl.
G06F 13/14 (2006.01)
(52) U.S. Cl.
USPC ...... 710/14; 710/8; 710/10; 710/11; 710/301; 710/58; 710/60; 713/300; 713/320; 713/322; 713/340
(58) Field of Classification Search
USPC ....... 710/8, 10–11, 14, 58, 60, 301; 713/300, 713/320, 322, 340
See application file for complete search history.

(56) References Cited

U.S. PATENT DOCUMENTS

| 6,950,960 | B2 * | 9/2005 | Mohammad | 713/600 |
| 7,069,347 | B1 | 6/2006 | Kolokowsky | |
| 7,631,126 | B2 * | 12/2009 | Barake et al. | 710/105 |
| 7,685,328 | B2 * | 3/2010 | Fruhauf et al. | 710/11 |
| 7,698,490 | B2 * | 4/2010 | Terrell, II | 710/302 |

FOREIGN PATENT DOCUMENTS

| JP | 2005-182380 | 7/2005 |
| JP | 2005-327247 | 11/2005 |
| JP | 2006-330831 | 12/2006 |
| JP | 2007-172160 | 7/2007 |

* cited by examiner

Primary Examiner — Tammara Peyton
(74) Attorney, Agent, or Firm — Brinks Hofer Gilson & Lione

(57) ABSTRACT

A communication speed control application sets the initial communication mode of the USB controller to a full speed mode through a USB driver. If a data transfer start request is received from a USB device using application and if the requested communication speed is a high speed communication mode, the communication speed mode of the USB controller is changed to a high speed mode through the USB driver. The USB application estimates the transfer rate required for the data transfer to be executed and, if the estimated transfer rate is higher than the full speed mode or the transfer rate resulting from subtraction of a predetermined margin from the full speed, the requested communication speed is set to the high speed or is set to full speed otherwise.

10 Claims, 4 Drawing Sheets

COMMUNICATION APPARATUS AND METHOD FOR COMMUNICATING WITH AN EXTERNAL DEVICE THROUGH USB INTERFACE USING A HIGH-SPEED OR LOW-SPEED COMMUNICATION MODE

PRIORITY CLAIM

This application claims the benefit of Japanese Patent Application No. 2010-184819, filed on Aug. 20, 2010, and which is incorporated by reference herein in its entirety.

BACKGROUND

1. Field of the Invention

The present invention relates to a technology which changes the communication speed in a communication apparatus which communicates with a peripheral apparatus.

2. Description of the Related Art

The technology which changes the communication speed in a communication apparatus which communicates with a peripheral device may include a system including a USB device and a host apparatus and being capable of performing communication via a USB (Universal Serial Bus) at two different communication speeds of a full speed and a high speed. The system changes the communication speed to/from a USB device to a lower full speed if a host apparatus detects deterioration of the communication quality during communication to/from the USB device at a high speed which is a higher speed than the communication speed. (Refer to Japanese Unexamined Patent Application Publication Nos. 2007-172160 and 2005-182380, for example).

Another technology has also been known that a host apparatus in such a system changes the communication speed to/from a USB device in accordance with the amount of data to be transferred to the USB device. In this case, if the amount of data is small, the communication speed is changed to a lower full speed. If the amount of data is large, the communication speed is changed to a high speed which is higher than the full speed. (Refer to Japanese Unexamined Patent Application Publication No. 2006-330831).

Another technology in a system which uses a USB for communication has been known in which a host apparatus dynamically changes the communication speed to/from a USB device without resetting the USB. (Refer to Japanese Unexamined Patent Application Publication No. 2007-172160).

In general, a high speed which is a higher communication speed produces large power consumption during data transfer and a standby state than a full speed which is a lower communication speed. However, switching the communication speed to the lower full speed only if deterioration in communication quality is detected or if a small amount of data is to be transferred may not sufficiently prevent the power consumption.

On the other hand, if the communication speed is always kept at the lower full speed, the power consumption can be suppressed, and deterioration in communication quality can be prevented, compared with the case where the communication speed is high. However, the communication speed may not be enough for applications which communicate with a USB device.

SUMMARY

Accordingly, it is an object of the present invention to provide a communication apparatus which communicates with a peripheral apparatus and changes the communication speed to suppress power consumption to a necessary and sufficient level for applications in which communication is performed.

In order to achieve the object, the present invention is a communication apparatus which has modes of communication to/from an external device connected thereto of high communication speed mode in which data transfer is performed at a first communication speed and a low communication speed mode in which data transfer is performed at a second communication speed which is lower than the first communication speed, the communication apparatus including a high-speed-communication-required state detecting unit which detects a high-speed-transfer-required state that is data transfer to be started with the external device at the data transfer rate requested by the data transfer beyond the data transfer rate which can be provided by the communication speed in the low communication speed mode, and a communication speed control unit which initially sets the communication mode to the low-speed communication mode, if the high-speed-communication-required state detecting unit detects the high-speed-transfer-required state, changes the communication mode to the high speed communication mode before the start of the detected high-speed-transfer-required data transfer and returns the communication mode to the low-speed communication mode upon completion of the high-speed-transfer-required data transfer.

The communication apparatus may be configured more specifically such that if the data transfer to be started to/from the external device is isochronous transfer, the high-speed-communication-required state detecting unit sets the bandwidth for the isochronous transfer to the data transfer rate requested by the data transfer. If the data transfer to be started to/from the external device may be data transfer for streaming reproduction, the high-speed-communication-required state detecting unit sets the minimum necessary data transfer rate for seamless execution of the streaming reproduction to the data transfer rate requested by the data transfer. The high-speed-communication-required state detecting unit may set the data transfer rate requested by the data transfer not to be a high-speed-transfer-required state by determining that the transfer rate is a transfer rate which is equal to or lower than the data transfer rate provided by the communication speed in the low communication speed mode if the data transfer to be started to/from the external device does not perform real time processing on data transferred by the data transfer.

In the communication apparatus, during a period for a data transfer requested to perform at a data transfer rate beyond the data transfer rate which can be provided by the communication speed in the low communication speed mode, the communication mode is the high speed communication mode. Thus, the data transfer can be performed at the data transfer rate requested by the data transfer. On the other hand, during the other periods including a standby period, the communication mode is set to the low-speed communication mode, which may suppress the power consumption.

According to the present invention therefore, the communication speed can be changed such that the power consumption can be suppressed to a necessary and sufficient level for the data transfer to be executed.

In order to achieve the object, the present invention is a communication apparatus which has modes of communication to/from an external device connected thereto of high communication speed mode in which data transfer is performed at a first communication speed and a low communication speed mode in which data transfer is performed at a second communication speed which is lower than the first communication speed, the communication apparatus including a high-speed-communication-required state detecting unit which detects the necessity for high speed communication if the total of the data transfer rate required by the data transfer to be started with the external device and the data transfer rate requested by the data transfer being currently executed is beyond the data transfer rate which can be provided by the communication speed in the low communication speed mode, and a communication speed control unit which initially sets the communication mode to the low-speed communication mode, and, if the high-speed-communication-required state detecting unit detects the necessity for high speed communication when the current communication mode is the low-speed communication mode, changes the communication mode to the high speed communication mode.

In this case, the communication speed control unit may return the communication mode to the low-speed communication mode if the total of data transfer rates requested by the data transfers currently being executed is equal to or lower than the data transfer rate which can be provided by the communication speed in the low communication speed mode when the present communication mode is the high speed communication mode. Alternatively, the communication speed control unit may return the communication mode to the low-speed communication mode if isochronous transfer is not currently being executed and the total of data transfer rates requested by the data transfers currently being executed is equal to or lower than the data transfer rate which can be provided by the communication speed in the low communication speed mode when the present communication mode is the high speed communication mode.

The communication apparatus may be configured such that, if the data transfer is isochronous transfer, the high-speed-communication-required state detecting unit sets the bandwidth for the isochronous transfer to the data transfer rate requested by the data transfer. If the data transfer may be data transfer for streaming reproduction, the high-speed-communication-required state detecting unit sets the minimum necessary data transfer rate for seamless execution of the streaming reproduction to the data transfer rate requested by the data transfer. The high-speed-communication-required state detecting unit may set a predetermined data transfer rate which is equal to or lower than the data transfer rate provided by the communication speed in the low communication speed mode to the data transfer rate requested by the data transfer if the data transfer does not perform real time processing on data transferred by the data transfer.

According to the communication apparatus, the communication mode may be initially set to the low-speed communication mode, and the power consumption can be suppressed. When a plurality of data transfers are to be performed simultaneously, the communication mode is changed to the high speed communication mode only if the total of data transfer rates requested by the data transfers is higher than the data transfer rate which can be provided by the communication speed in the low communication speed mode. Thus, the data transfers can be executed at the data transfer rates requested by the data transfers. Thus, the data transfers can be executed at the data transfer rates requested by the data transfers.

According to the present invention therefore, the communication speed can be changed such that the power consumption can be suppressed to the necessary and sufficient level for data transfers.

In the aforementioned communication apparatuses, the communication with the connected external device may be communication using a USB. In this case, the high speed communication mode is a high speed mode in which the communication speed of the USB may be the high speed for data transfer, and the low-speed communication mode may be the full speed mode in which the communication speed of the USB is the full speed for data transfer.

As described above, according to the present invention, there can be provided a communication apparatus which communicates with a peripheral apparatus and changes the communication speed to suppress power consumption to a necessary and sufficient level for applications in which communication is performed.

DETAILED DESCRIPTION

Figure 1A:
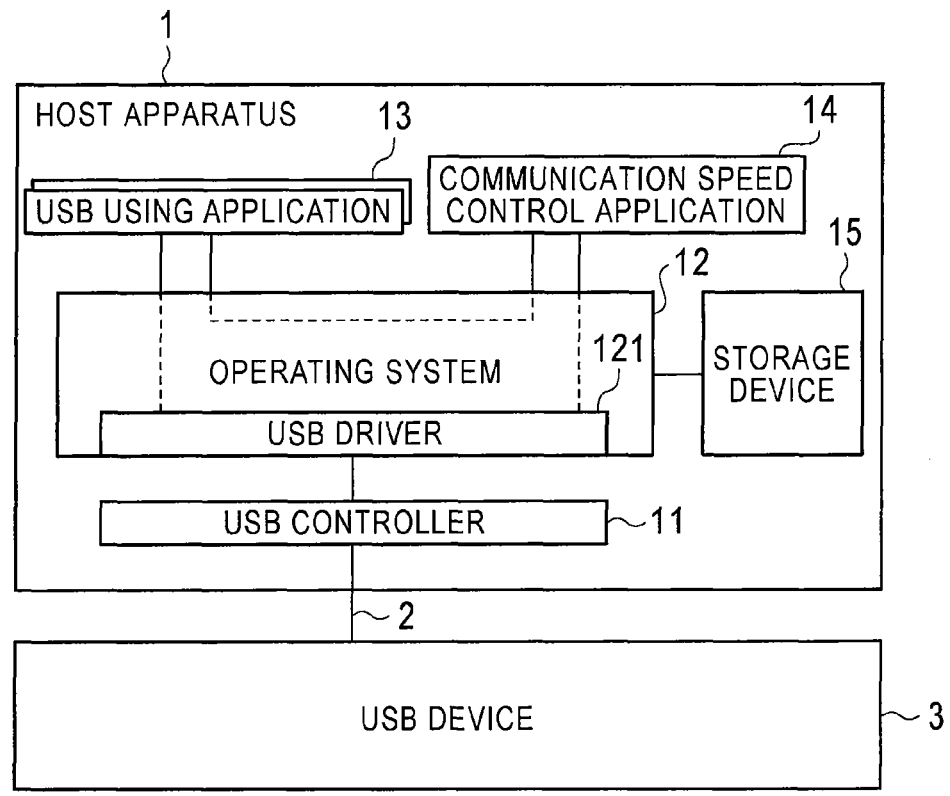
FIGS. 1A and 1B illustrate the configuration of a communication apparatus according to an embodiment of the present invention.

FIG. 1A illustrates the configuration of a host apparatus according to one embodiment.

As illustrated in FIG. 1A, a USB device 3 can be connected to a host apparatus 1 through a USB 2. The host apparatus 1 includes a USB controller 11 which performs data transfer to/from the USB device 3 through the USB 2, an operating system 12, a USB using application 13 which performs processing by using the USB device 3, a communication speed control application 14, and a storage device 15. The operating system 12 includes a USB driver 121 which controls the USB controller 11.

The host apparatus 1 has a hardware configuration as a computer including a CPU, a memory, the USB controller 11, the storage device 15 and other peripheral devices. The operating system 12, USB using application 13, and communication speed control application 14 may be implemented by execution of a program stored in advance in the storage device 15 by the CPU. The USB using application 13 and communication speed control application 14 are applications to be executed on the operating system 12. The applications can perform various processing by using a resource and/or a function of the operating system 12.

Figure 1B:
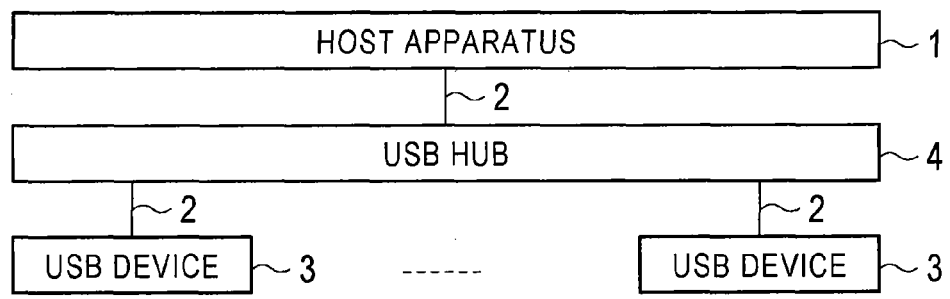

However, a plurality of USB devices 3 may be connected to the host apparatus 1 through a USB hub 4, as illustrated in FIG. 1B.

The USB controller 11 in the host apparatus 1, the USB device 3 connected to the host apparatus 1, and the USB hub 4 connected to the host apparatus 1 have communication speed modes of a full speed mode in which communication is performed at a communication speed (bus speed) of a full speed=12 Mbits/s and a high speed mode in which communication is performed at a communication speed (bus speed) of a high speed=480 Mbits/s and are capable of operating in both of the communication speed modes of full speed mode and high speed mode.

There will be described an operation of changing the communication speed of communication with the USB device 3 in the host apparatus 1.

Figure 2:
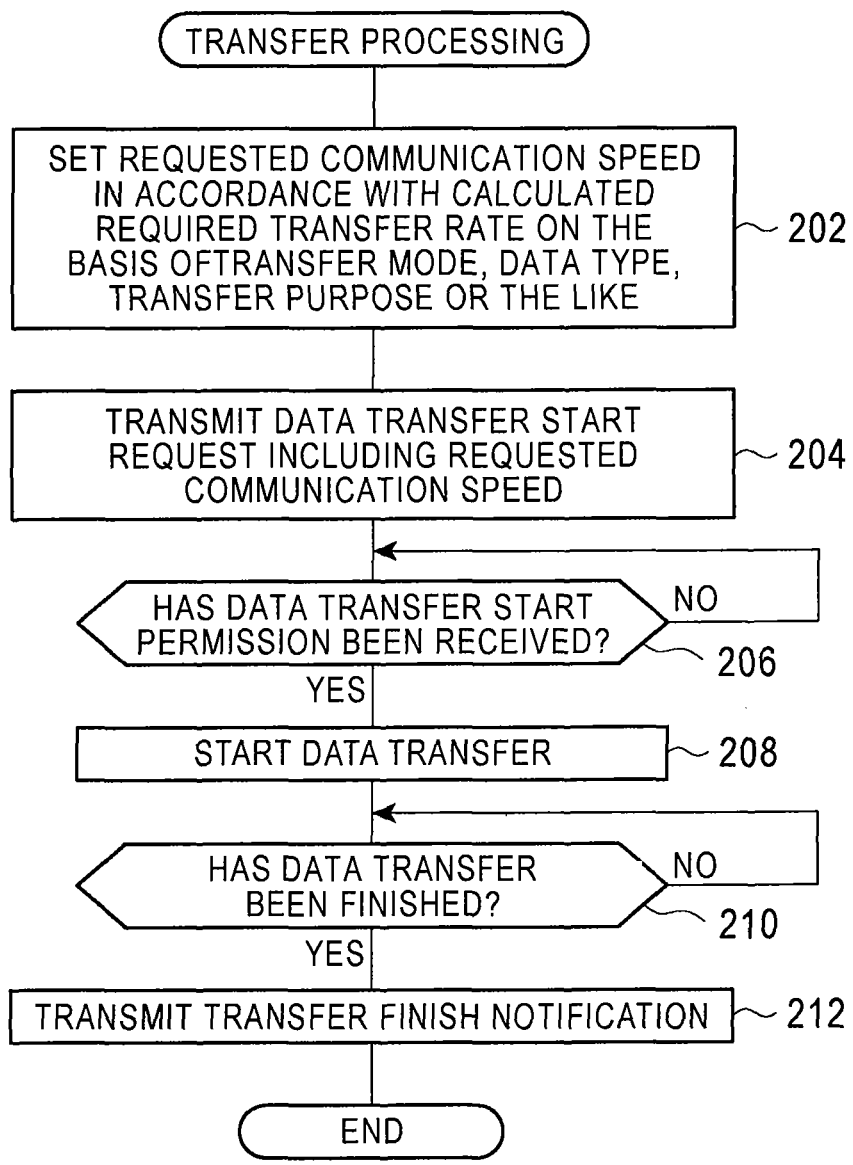
FIG. 2 is a flowchart illustrating transfer processing according to an embodiment of the present invention.

First of all, the USB using application 13 performs the transfer processing illustrated in FIG. 2 to implement data transfer to/from the USB device 3 if the data transfer to/from the USB device 3 is required.

As illustrated in FIG. 2, the transfer processing first sets either full speed or high speed to the requested communication speed in accordance with the nature and application of the data transfer (step 202).

In other words, in step 202, the transfer rate required for the data transfer to be executed is estimated. If the estimated transfer rate exceeds the transfer rate as a result of the subtraction of a predetermined margin from the full speed or full speed, the requested communication speed is set to the high speed. Otherwise, it is set to the full speed.

The transfer rate required for the data transfer to be executed is set to the bandwidth of isochronous transfer if the transfer mode of the data transfer to be executed is isochronous transfer.

In order to perform real time processing on the transferred data without isochronous transfer, the transfer rate required for the real time processing is set to the transfer rate required for the data transfer to be executed. For example, the transfer rate required for the data transfer for transferring data for audio data or video data streaming reproduction is set to the necessary minimum data transfer rate for seamless execution of the streaming reproduction. The necessary minimum data transfer rate for seamless execution of the streaming reproduction can be acquired from the data type (coding type) indicated by the extension of the file of audio data or video data or the reproduction bit rate of the audio data or video data separately obtained from a USB device as information on the file.

If the real time processing is not to be performed on the other transferred data, for example, if data transfer is performed to simply copy a file from the USB device 3 to the storage device 15 in the host apparatus 1, the transfer rate that is equal to or lower than the predetermined full speed is set to the transfer rate required for the data transfer to be executed. However, bulk transfer which allows retransmission of error data is to be performed, the occurrence of an error does not cause a large problem. If data transfer is to be performed by bulk transfer, the transfer rate beyond the predetermined full speed may be set to the transfer rate required for the data transfer to be executed.

After the requested communication speed is set in that manner, a data transfer start request including the set requested communication speed is next transmitted to the communication speed control application 14 (step 204). The processing waits for the response of a data transfer start permission from the communication speed control application 14 (step 206).

If the data transfer start permission is responded from the communication speed control application 14, the data transfer to/from the USB device 3 through the operating system 12 and USB driver 121 (step 208). If the data transfer finishes (step 210), transfer finish notification is transmitted to the communication speed control application 14 (step 212). The transfer processing then ends.

Next, communication speed control processing to be performed by the communication speed control application 14 will be described.

Figure 3:
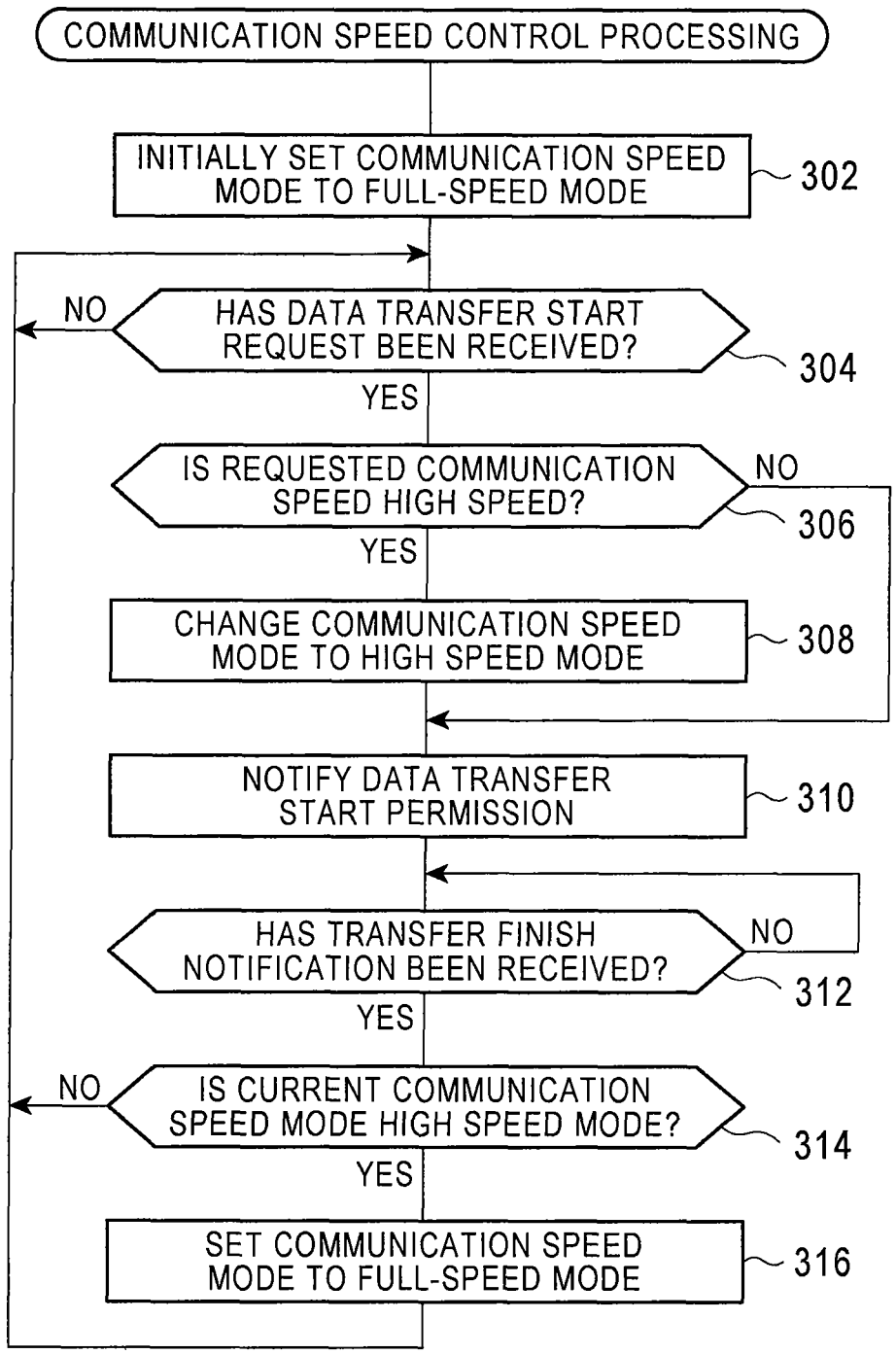
FIG. 3 is a flowchart illustrating communication speed control processing according to an embodiment of the present invention.

The communication speed control processing is automatically started to execute when the host apparatus 1 is started. FIG. 3 illustrates a routine of the communication speed control processing.

However, the host apparatus 1 is configured here such that the connection of the USB device 3 to the host apparatus 1 is limited to direct connection of a single USB device 3 to the host apparatus 1 without through the USB hub 4 and that the host apparatus 1 can simultaneously perform single data transfers only.

As illustrated in FIG. 3, in the processing, the communication speed mode of the USB controller 11 is initially set to the full speed mode through the USB driver 121 (step 302). If the communication speed mode is set to the full speed mode, the USB controller 11 sets its communication speed mode to the full speed mode. If the communication speed mode of the USB controller 11 is the full speed mode and the USB controller 11 detects the connection of the USB device 3, the USB controller 11 sets the communication speed mode of the USB device 3 to the full speed mode. The setting of the communication speed mode of the USB device 3 by the USB controller 11 is implemented by the reset of the USB 2 and CHIRP handshake during the reset period.

If both of the communication speed modes of the USB controller 11 and USB device 3 are set to the full speed mode in that way, the USB controller 11 and USB device 3 can then perform data transfer at the full speed.

Next, if the communication speed mode of the USB controller 11 is set to the full speed mode, the reception of a data transfer start request from the USB using application 13 is monitored (step 304).

If a data transfer start request is received from the USB using application 13 (step 304), whether the requested communication speed included in the data transfer start request is the high speed or not is checked (step 306).

Next, if the requested communication speed included in the data transfer start request is not the high speed but the full speed (step 306), a data transfer start permission is responded to the USB using application 13 which has issued the data transfer start request (step 310). The reception of the transfer finish notification from the USB using application 13 is then waited (step 312). If the present communication speed mode of the USB controller 11 is the high speed mode (step 314), the communication speed mode of the USB controller 11 is changed to the full speed mode through the USB driver 121 (step 316). The processing returns to the monitoring of the reception of a data transfer start request in step 304.

If the communication speed mode is changed to the full speed mode, the USB controller 11 changes its communication speed mode to the full speed mode. If the USB device 3 is connected to the USB controller 11 when the communication speed mode is changed to the full speed mode, the USB controller 11 changes the communication speed mode of the USB device 3 to the full speed mode. The change of the communication speed mode of the USB device 3 by the USB controller 11 is implemented by the reset of the USB 2 and CHIRP handshake during the reset period.

On the other hand, if the requested communication speed involved in the data transfer start request the reception of which has been detected in step 304 is the high speed (step 306), the communication speed mode of the USB controller 11 is changed to the high speed mode through the USB driver 121 (step 308).

When the communication speed mode is changed to the high speed mode, the USB controller 11 changes its communication speed mode to the high speed mode. If the USB device 3 is connected to the USB controller 11 when the communication speed mode is changed to the high speed mode, the USB controller 11 changes the communication speed mode of the USB device 3 to the high speed mode. The change of the communication speed mode of the USB device 3 by the USB controller 11 is implemented by the reset of the USB 2 and CHIRP handshake during the reset period. The high speed mode is set to the communication speed modes of both of the USB controller 11 and USB device 3, the USB controller 11 and the USB device 3 can perform data transfer at the high speed since then.

The data transfer start permission is responded to the USB using application 13 having issued the data transfer start request (step 310). The reception of the transfer finish notification from the USB using application 13 is then waited (step 312). If the present communication speed mode of the USB controller 11 is the high speed mode (step 314), the communication speed mode of the USB controller 11 is changed to the full speed mode through the USB driver 121 (step 316). The processing returns to the monitoring of the reception of a data transfer start request in step 304.

Up to this point, the communication speed control processing to be performed by the communication speed control application 14 has been described. The functions of the communication speed control application 14 for performing the communication speed control processing may be included in the USB driver 121.

Up to this point, an embodiment of the present invention has been described.

According to this embodiment, during the period for performing data transfer requested to perform at a data transfer rate beyond the data transfer rate which can be provided by the communication speed in the full speed mode, the communication speed mode is set to the high speed mode, and the data transfer can be performed at the data transfer rate requested for the data transfer. On the other hand, in the other period including a standby period, the communication mode is set to the full speed mode, and the power consumption may be suppressed. Even during a standby period without data transfer being performed, the USB driver 121 operates at the speed according to the communication speed mode. Thus, the full speed mode may provide smaller power consumption in the USB driver 121 than the high speed mode.

According to the embodiment therefore, the communication speed mode can be changed in order to suppress the power consumption to the necessary and sufficient level for data transfer.

Having described the case where the single USB device 3 is connected to the host apparatus 1 and the data transfer to be performed simultaneously by the USB using application 13 is limited to single data transfer, this embodiment is applicable to the case where a plurality of USB devices 3 are connected to the host apparatus 1 through the USB hub 4 and/or the host apparatus 1 is capable of simultaneously performing a plurality of data transfers. Embodiments will be described below in which a plurality of USB devices 3 are connected to the host apparatus 1 through the USB hub 4 and the host apparatus 1 is capable of simultaneously performing a plurality of data transfers.

In a case where a plurality of USB devices 3 are connected to the host apparatus 1 through the USB hub 4 or a case where the host apparatus 1 is capable of simultaneously performing a plurality of data transfers, when the USB hub 4 is used to relay between the USB device 3 and the host apparatus 1, the USB hub 4 includes a function of setting the communication speed mode of the downstream side (USB device side) to the communication speed mode of the upstream side (host apparatus side). That is, if the communication speed mode to/from the host apparatus 1 or another USB hub 4 directly connected to the upstream side is set to the high speed, the USB hub 4 sets the communication speed mode to/from the other USB hub 4 or USB device 3 directly connected to the downstream side to the high speed. If the communication speed mode to/from the host apparatus 1 or another USB hub 4 directly connected to the upstream side is set to the full speed, the USB hub 4 sets the communication speed mode to/from the other USB hub 4 or USB device 3 directly connected to the downstream side to the full speed. If the communication speed mode to/from the host apparatus 1 or another USB hub 4 directly connected to the upstream side is changed from the high speed to the full speed or from the full speed to the high speed, the USB hub 4 sets the communication speed mode to/from the other USB hub 4 or USB device 3 directly connected to the downstream side is changed as in the upstream side. The communication speed mode of the upstream side of the USB hub 4 or USB device 3 is set or switched by the reset of the USB 2 and CHIRP handshake during the reset period by the host apparatus 1 or another USB hub 4 directly connected to the upstream side so as to be in accordance with the communication speed mode of the downstream side of the apparatus directly connected to the upstream side.

In step 204 in the transfer processing illustrated in FIG. 2, the USB using application 13 transmits the set requested communication speed and the data transfer start request including the transfer rate required for the data transfer, which has been estimated in step 202, to the communication speed control application 14.

Figure 4:
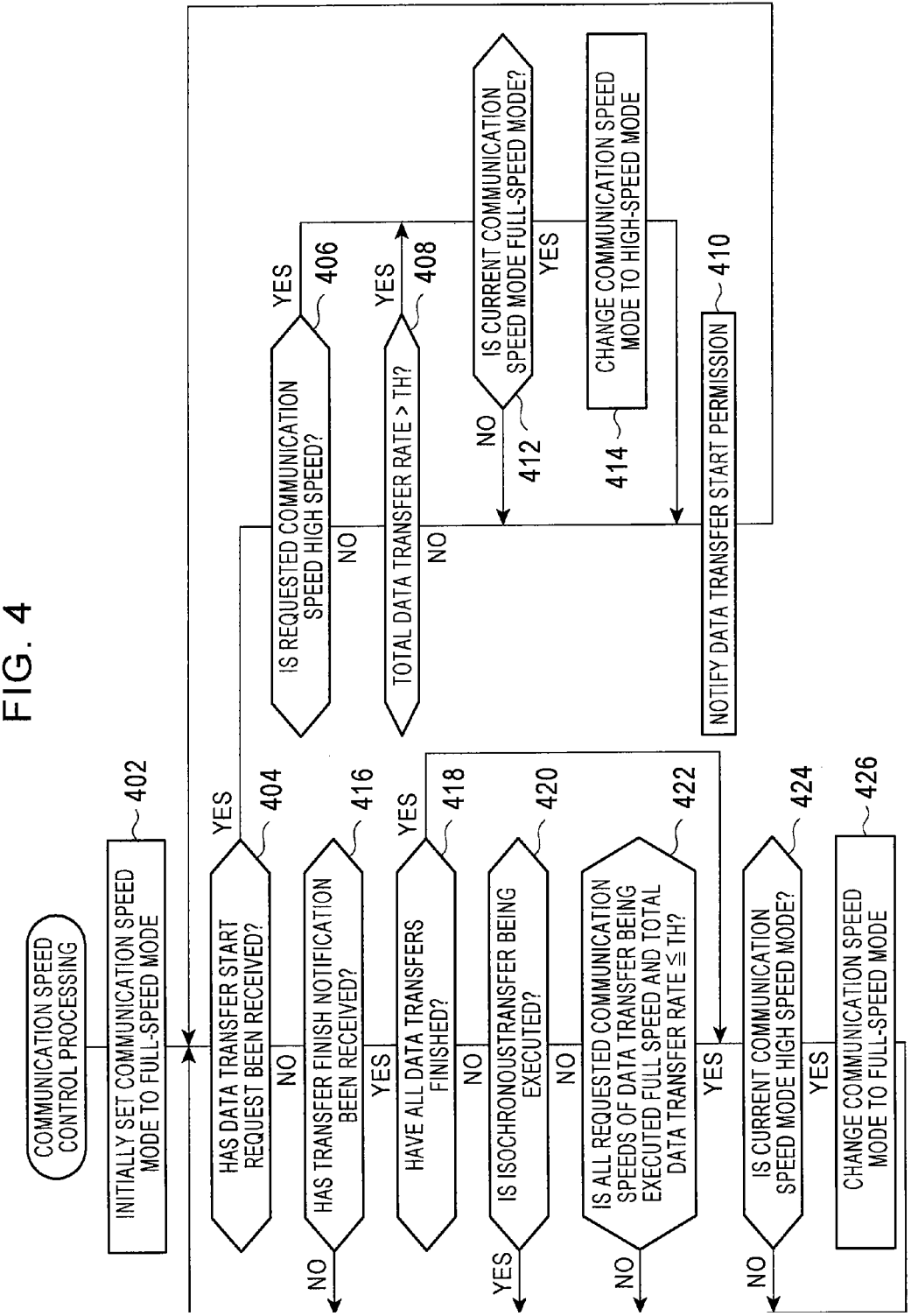
FIG. 4 is a flowchart illustrating communication speed control processing according to an embodiment of the present invention.

The communication speed control application 14 performs communication speed control processing in FIG. 4, instead of the communication speed control processing in FIG. 3.

That is, the communication speed control application 14 in the communication speed control processing initially sets the communication speed mode of the USB controller 11 to the full speed mode through the USB driver 121 (step 402), as illustrated in FIG. 4.

The reception of a data transfer start request from the USB using application 13 (step 404) and the reception of the transfer finish notification from the USB using application 13 (step 416) are monitored.

If a data transfer start request is received from the USB using application 13 (step 404), whether the requested communication speed involved in the data transfer start request is the high speed or not is checked (step 406). If the requested communication speed involved in the data transfer start request is the high speed and if the present communication speed mode of the USB controller 11 is the full speed mode (step 412), the communication speed mode is changed to the high speed mode (step 414). The data transfer start permission is responded to the USB using application 13 having issued the data transfer start request (step 410), and the processing returns to the monitoring in steps 404 and 416. On the other hand, if the present communication speed mode is the high speed mode (step 412), the data transfer start permission is responded to the USB using application 13 having issued the data transfer start request (step 410) as it is. Then, the processing returns to the monitoring in steps 404 and 416.

On the other hand, if it is determined in step 406 that the requested communication speed involved in the data transfer start request is not the high speed, whether the total of the transfer rate involved in the data transfer start request received in step 404 and the transfer rate involved in the data transfer start requests received in the past for the data transfers currently being executed is higher than a predetermined threshold value TH or not is checked. The threshold value TH refers to a value of the full speed or a value resulting from the subtraction of a predetermined margin from the full speed.

If the total of transfer rates is higher than the threshold value TH (step 408) and if the present communication speed mode is the full speed mode (step 412), the communication speed mode is changed to the high speed mode (step 414). The data transfer start permission is responded to the USB using application 13 having issued the data transfer start request (step 410), and the processing returns to the monitoring in steps 404 and 416. On the other hand, if the present communication speed mode is the high speed mode (step 412), the data transfer start permission is responded to the USB using application 13 having issued the data transfer start request (step 410) as it is, and the processing returns to the monitoring in steps 404 and 416.

If the total of the transfer rates is not higher than the threshold value TH (step 408), the data transfer start permission is responded to the USB using application 13 having issued the data transfer start request (step 410) as it is, and the processing returns to the monitoring in steps 404 and 416.

Next, in the monitoring in step 404 or 416, if a transfer finish notification is received from the USB using application 13 (step 416), whether all data transfers being executed by the USB using application 13 have finished or not is determined (step 418). If so, whether the present communication speed mode is the high speed mode or not is checked (step 424). If not, the communication speed mode is changed to the full speed mode (step 426), and the processing returns to the monitoring in steps 404 and 416. If it is not the high speed mode but the full speed mode, the processing directly returns to the monitoring in steps 404 and 416.

On the other hand, if it is determined in step 418 that all data transfers being executed by the USB using application 13 have not been finished, whether isochronous transfer is currently being performed or not is checked (step 420). If so, the processing returns to the monitoring in steps 404 and 416. The information on whether isochronous transfer is currently being performed or not may be acquired by inquiring the USB driver 121 of the presence of isochronous transfer being executed.

If isochronous transfer is not currently performed on the other hand (step 420), whether all of the requested communication speeds involved in the data transfer start request received in the past for the data transfers currently being executed are the full speed and the total of the transfer rates involved in the data transfer start requests received in the past for the data transfers being currently executed is equal to or lower than the threshold value TH or not is checked (step 422). One of the requested communication speeds involved in the data transfer start request received in the past for the data transfers currently being executed is the high speed or the total of the transfer rates involved in the data transfer start requests received in the past for the data transfers being currently executed is higher than the threshold value TH, the processing returns to the monitoring in steps 404 and 416. On the other hand, if all of the requested communication speeds involved in the data transfer start request received in the past for the data transfers currently being executed are the full speed and the total of the transfer rates involved in the data transfer start requests received in the past for the data transfers being currently executed is equal to or lower than the threshold value TH (step 422), whether the present communication speed mode is the high speed mode or not is checked (step 424). If they are the high speed mode, the communication speed mode is changed to the full speed mode (step 426), the processing returns to the monitoring in steps 404 and 416. If they are not the high speed mode but the full speed mode, the processing returns to the monitoring in steps 404 and 416 as they are.

Up to this point, the case where a plurality of USB devices 3 are connected to the host apparatus 1 through the USB hub 4 and the case where the host apparatus 1 is configured to be capable of simultaneously executing a plurality of data transfers have been described.

According to the embodiment, basically, when a plurality of data transfers are to be executed simultaneously, the communication speed mode is changed to the high speed mode only during a period when the total of the data transfer rates requested by the data transfers is beyond the data transfer rate which can be provided by the communication speed in the full speed mode. Thus, the data transfers can be executed at the data transfer rate requested by the data transfers.

On the other hand, during the other period including a standby period, the communication speed mode is set to the full speed mode, and the power consumption can be suppressed.

This allows changing of the communication speed mode such that the power consumption can be suppressed to the necessary and sufficient level for the data transfers.

The aforementioned embodiments are also applicable to communications in which a plurality of different communication speeds can be used, excluding USB communication.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims

What is claimed is:

1. A communication apparatus that communicates with an external device using a high-speed communication mode or a low-speed communication mode, the communication apparatus comprising:
   a communication speed control unit configured to initially set a communication mode to the low-speed communication mode as a default condition so as to reduce power consumption;
   a speed requirement detecting unit configured to determine, upon connection of the external device with the communication apparatus, if the high-speed communication mode is required for communication with the external device;
   the communication speed control unit configured to change the communication mode to the high-speed communication mode prior to a data transfer with the external device if the speed requirement detecting unit determines that the high-speed communication mode is required;
   upon completion of the data transfer, the communication speed control unit is configured to return the communication mode to the low-speed communication mode as the default condition: and
   wherein the communication speed control unit returns the communication mode to the low-speed communication mode if an isochronous transfer is not currently executing and a total of data transfer rates requested by the data transfers currently executing is equal to or lower than the data transfer rate which can be provided by the low speed communication mode.

2. The communication apparatus according to claim 1, wherein if the data transfer is an isochronous transfer, the communication speed control unit sets a bandwidth for the isochronous transfer equal to a data transfer rate requested by the external device.

3. The communication apparatus according to claim 1, wherein if the data transfer corresponds to a streaming reproduction, the communication speed control unit sets the data transfer rate to a minimum value that facilitates seamless execution of the streaming reproduction.

4. The communication apparatus according to claim 1, wherein the communication speed control unit sets the data transfer rate to a value that is less than or equal to the data transfer rate of the low-speed communication mode, if the data transfer is not a real-time data transfer.

5. The communication apparatus according to claim 1, wherein communication with the external device occurs through a universal serial bus (USB) interface and wherein the high-speed communication mode corresponds to a data transfer rate of the USB interface.

6. A communication apparatus that communicates with an external device using a high-speed communication mode or a low-speed communication mode, the communication apparatus comprising:

a communication speed control unit configured to initially set a communication mode to the low-speed communication mode as a default condition so as to reduce power consumption;

a speed requirement detecting unit configured to determine, upon connection of the external device with the communication apparatus, if the high-speed communication mode is required for communication with the external device based on a total of multiple data transfer rates requested by the external device;

wherein, if the speed requirement detecting unit determines that the high-speed communication mode is required and the current communication mode is the low-speed communication mode, the communication speed control unit changes the communication mode to the high-speed communication mode, where upon completion of all data transfers, the communication speed control unit is configured to return the communication mode to the low-speed communication mode as the default condition; and wherein the communication speed control unit returns the communication mode to the low-speed communication mode if an isochronous transfer is not currently executing and a total of data transfer rates requested by the data transfers currently executing is equal to or lower than the data transfer rate which can be provided by the low speed communication mode.

7. The communication apparatus according to claim 6, wherein the communication speed control unit returns the communication mode to the low-speed communication mode if a total of data transfer rates requested by the data transfers currently executed is less than or equal to the data transfer rate of the low-speed communication mode.

8. A method for communication between a communication apparatus and an external device, the method utilizing a high-speed communication mode or a low-speed communication mode, the method comprising:

initially setting a communication mode, by a communication speed control unit, to the low-speed communication mode as a default condition so as to reduce power consumption;

determining, by a speed requirement detecting unit, upon connection of the external device with the communication apparatus, if the high-speed communication mode is required for communication with the external device;

changing the communication mode to the high-speed communication mode, by the communication speed control unit, prior to a data transfer with the external device, if the speed requirement detection unit determines that the high-speed communication mode is required;

upon completion of the data transfer, returning the communication mode to the low-speed communication mode, by the communication speed control unit as the default condition; and returning the communication mode to the low-speed communication mode if an isochronous transfer is not currently executing and a total of data transfer rates requested by the data transfers currently executing is equal to or lower than the data transfer rate which can be provided by the low speed communication mode.

9. The computer readable medium or data storage means according to claim 8, wherein the communication with the external device occurs through a universal serial bus (USB) interface, and wherein the high speed communication mode corresponds to the data transfer rate of the USB interface.

10. The method according to claim 8, wherein the communication speed control unit sets the data transfer rate to the low-speed communication mode if a total of data transfer rates currently executing is less than or equal to the data transfer of the low-speed communication mode.

* * * * *